(12) United States Patent
Uematsu et al.

(10) Patent No.: US 12,291,278 B2
(45) Date of Patent: May 6, 2025

(54) JACKING POINT STRUCTURE

(71) Applicant: MEIDENSHA CORPORATION, Tokyo (JP)

(72) Inventors: Yoichi Uematsu, Nagoya (JP); Yoshinori Sugahara, Kanagawa (JP); Hiroaki Tanaka, Kanagawa (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/289,515

(22) PCT Filed: Mar. 2, 2022

(86) PCT No.: PCT/JP2022/008705
§ 371 (c)(1),
(2) Date: Jun. 10, 2024

(87) PCT Pub. No.: WO2022/234713
PCT Pub. Date: Nov. 10, 2022

(65) Prior Publication Data
US 2024/0317323 A1 Sep. 26, 2024

(30) Foreign Application Priority Data
May 6, 2021 (JP) .................................. 2021-078389

(51) Int. Cl.
*B62D 25/20* (2006.01)
(52) U.S. Cl.
CPC ................. *B62D 25/2081* (2013.01)
(58) Field of Classification Search
CPC B62D 25/2081; B62D 25/20; B62D 25/2009; B62D 25/2036
See application file for complete search history.

(56) References Cited

U.S. PATENT DOCUMENTS

| | | | | |
|---|---|---|---|---|
| 7,806,467 B2 * | 10/2010 | Sangu | ................... | B60N 2/015 296/187.11 |
| 2004/0222030 A1 * | 11/2004 | Szalony | ................... | B60G 3/24 180/311 |
| 2019/0263364 A1 * | 8/2019 | Yamamoto | ......... | B62D 25/2081 |

FOREIGN PATENT DOCUMENTS

| | | | |
|---|---|---|---|
| DE | 10143374 A1 | 3/2003 | |
| DE | 10 2006 030 769 B3 | 1/2008 | |
| DE | 102007012931 B3 * | 5/2008 | ............. B60S 11/00 |
| DE | 10 2017 129 954 A1 | 6/2019 | |
| GB | 2 447 538 A | 9/2008 | |
| JP | H01-169478 U | 11/1989 | |

(Continued)

OTHER PUBLICATIONS

BMW X5M jacking points (Year: 2017).*
(Continued)

*Primary Examiner* — Paul N Dickson
*Assistant Examiner* — Sara Laghlam
(74) *Attorney, Agent, or Firm* — Foley & Lardner LLP

(57) ABSTRACT

A jacking point structure disposed to project from a bottom surface of a vehicle and structured to be jacked up by a jacking device to provided. The jacking point structure includes a bottom including a jacking point surface structured to be lifted up first by the jacking device, and a partial contact surface disposed around the jacking point surface. The bottom of the jacking point structure may further include a curved surface between the jacking point surface and the partial contact surface.

9 Claims, 7 Drawing Sheets

(56) References Cited

FOREIGN PATENT DOCUMENTS

| | | | |
|---|---|---|---|
| JP | H08-188178 | A | 7/1996 |
| JP | 2004-314872 | A | 11/2004 |
| JP | 2018-030379 | A | 3/2018 |
| JP | 6322783 | B1 | 5/2018 |
| JP | 2019-151143 | A | 9/2019 |
| JP | 2019-206274 | A | 12/2019 |

OTHER PUBLICATIONS

Office Action, dated Mar. 6, 2024, issued in corresponding Chinese Patent Application No. CN202280033206.7.
Extended European search report, dated Jun. 20, 2024, issued in corresponding European Patent Application No. 22798820.1.
Office Action issued in JP Pat. App. No. 2021-078389, dated Oct. 1, 2024, with English translation.

* cited by examiner

(a)

(b) (c) (d) (e)

(a)

(b)

(a)

(b)

JACKING POINT STRUCTURE

TECHNICAL FIELD

The present invention relates to a jacking point structure used for jacking up a vehicle.

BACKGROUND ART

Patent Document 1 discloses a structure in which a floor jack 3 is used upon jacking up a vehicle, as shown in FIG. 9. For locating floor jack 3, the structure includes an additional component 2 to make a jacking point surface 4 project, in view of heights of surrounding components.

PRIOR ART DOCUMENT(S)

Patent Document(s)

Patent Document 1: JP H8-188178 A

SUMMARY OF THE INVENTION

Problem(s) to be Solved by the Invention

However, the jacking-up lifts and inclines the vehicle, and may cause a contact point of floor jack 3 to go out of jacking point surface 4. If the jacking-up is continued in such state, the vehicle may be deformed and/or damaged.

In view of the foregoing, it is desirable to solve the conventional problem by suppressing a vehicle from being deformed or damaged upon jacking-up.

Means for Solving the Problem(s)

(1) According to an aspect of the present invention, a jacking point structure disposed to project from a bottom surface of a vehicle and structured to be jacked up by a jacking device incudes a bottom including: a jacking point surface structured to be lifted up first by the jacking device; and a partial contact surface disposed around the jacking point surface.

(2) According to another aspect of the present invention, the bottom of the jacking point structure includes a recessed portion having an inversed U shape when viewed at a cross section. The jacking point surface is composed of a bottom surface of the recessed portion. The partial contact surface is composed of an inclined inner side surface of the recessed portion. Each of the jacking point surface and the partial contact surface is flat. The bottom of the jacking point structure includes a curved surface between the jacking point surface and the partial contact surface. The curved surface has a curvature radius set such that the curved surface is approximately flat.

(3) According to still another aspect of the present invention, the jacking point structure further includes a sound-and-vibration suppression part disposed in an outer periphery of a root of the jacking point structure and structured to suppress horizontal rolling of the jacking point structure.

(4) According to still another aspect of the present invention, the jacking point structure further includes a lightening hole disposed in one of both ends of the jacking point structure.

(5) According to still another aspect of the present invention, the lightening hole includes an inner surface curved to satisfy a condition of (a curvature radius of the inner surface)/(a thickness from the inner surface to a side surface of the jacking point structure)≥0.8.

(6) According to still another aspect of the present invention, the jacking point structure further includes a curved surface disposed in the outer periphery of the root of the jacking point structure, structured to relax stress due to the jacking-up, and curved to satisfy a condition of (a curvature radius of the curved surface)/(the thickness)≥5.

(7) According to still another aspect of the present invention, the jacking point structure further includes a protector structured to mitigate shock upon vehicle collision.

(8) According to still another aspect of the present invention, the jacking point structure is formed by casting with use of a slide mold.

(9) According to still another aspect of the present invention, the jacking point structure is formed by casting, integrally with an electric motor or with an electric motor and an power converter.

(10) According to still another aspect of the present invention, the jacking point structure is formed by casting, on a speed reducer, a gear case, or an oil pan.

Effect(s) of the Invention

The present invention serves to suppress a vehicle from being deformed or damaged upon jacking-up.

MODE(S) FOR CARRYING OUT THE INVENTION

The following describes jacking point structures according to first to fourth embodiments of the present invention.

Figure 1:
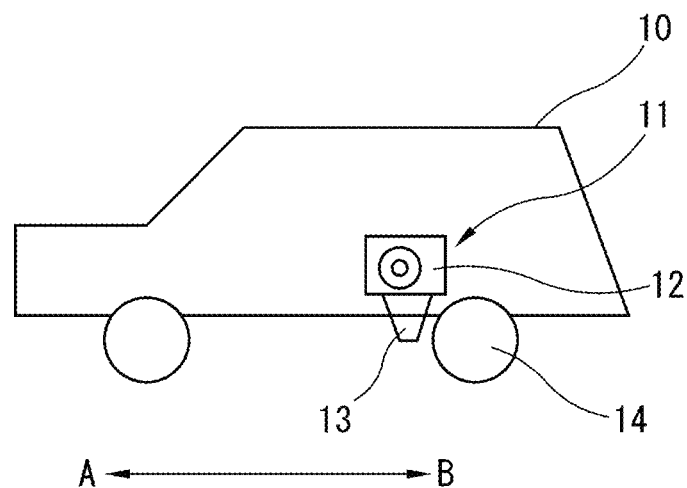
FIG. 1 is a schematic view showing that an electric motor including a jacking point according to a first embodiment is installed in a vehicle.

[First Embodiment] The following describes the first embodiment with reference to FIGS. 1 to 5. As shown in FIG. 1, the jacking point structure according to the first embodiment is applied to an electric motor 11 (e.g., a motor, an integrated device of a motor and an inverter, or an integrated device of a motor and an inverter and a speed changer) mounted in a vehicle 10 (e.g., a passenger car).

Figure 2:
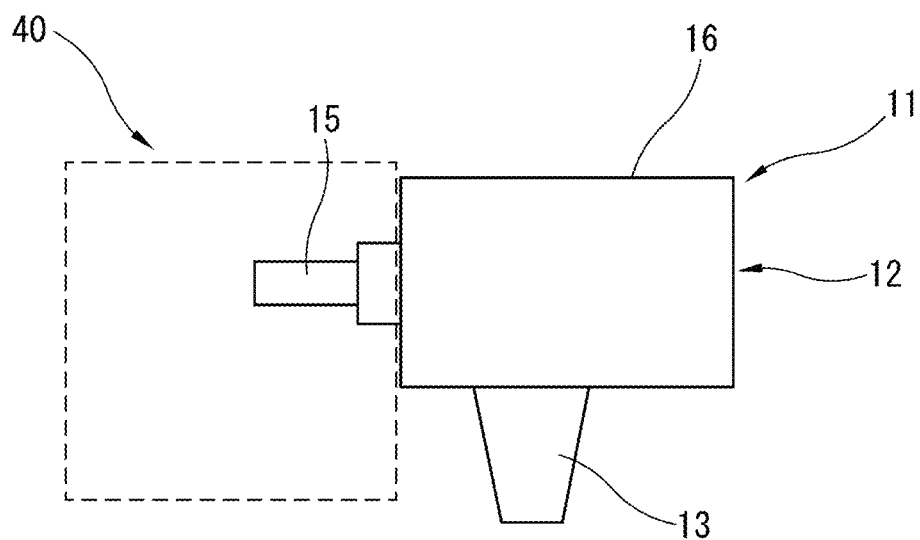
FIG. 2 is a front view of the electric motor.
Figure 3:
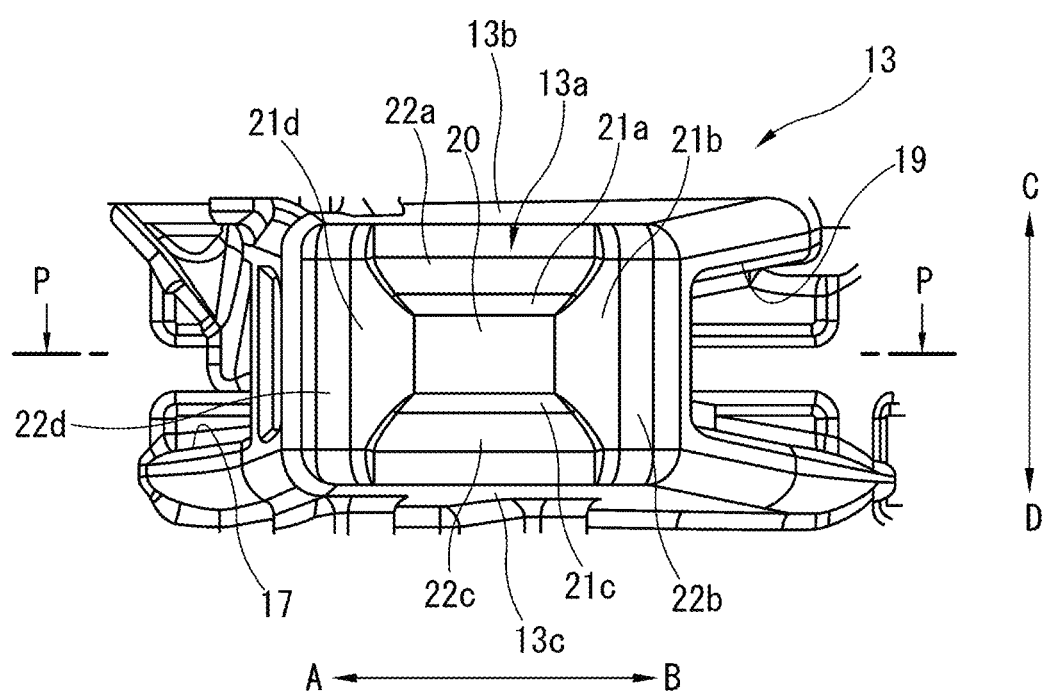
FIG. 3 is a bottom view of the jacking point.

As shown in FIG. 2, electric motor 11 includes a motor body 12 for driving rear wheels of vehicle 10, and includes a jacking point 13 (i.e., a jacking seat) integrated with motor body 12. In FIGS. 1 and 3, A-B direction represents a front-and-rear direction of vehicle 10. C-D direction represents a right-and-left direction of vehicle 10.

Motor body 12 includes: a housing 16; a rotational shaft 15 rotatably (i.e., pivotally) supported by housing 16; a rotor not shown that is fixed to rotational shaft 15; and a stator not shown that is disposed in housing 16 oppositely to the rotor. Rotational shaft 15 is connected to a speed changer 40. Motor body 12 is supplied with electric power converted by an inverter not shown.

Jacking point 13 is used when jacking up vehicle 10 with a jacking device such as floor jack 3. For example, vehicle 10 has to be temporarily lifted up upon tire exchange of rear wheels 14, underbody inspection involving rear wheels 14, etc.

As shown in FIG. 1, jacking point 13 is formed under housing 16, and extends in a direction of weight of motor body 12 coinciding with a direction of compression upon jacking-up, and projects with respect to a bottom surface of vehicle 10. Thus, the jacking-up is performed by locating floor jack 3 under jacking point 13.

Figure 4:
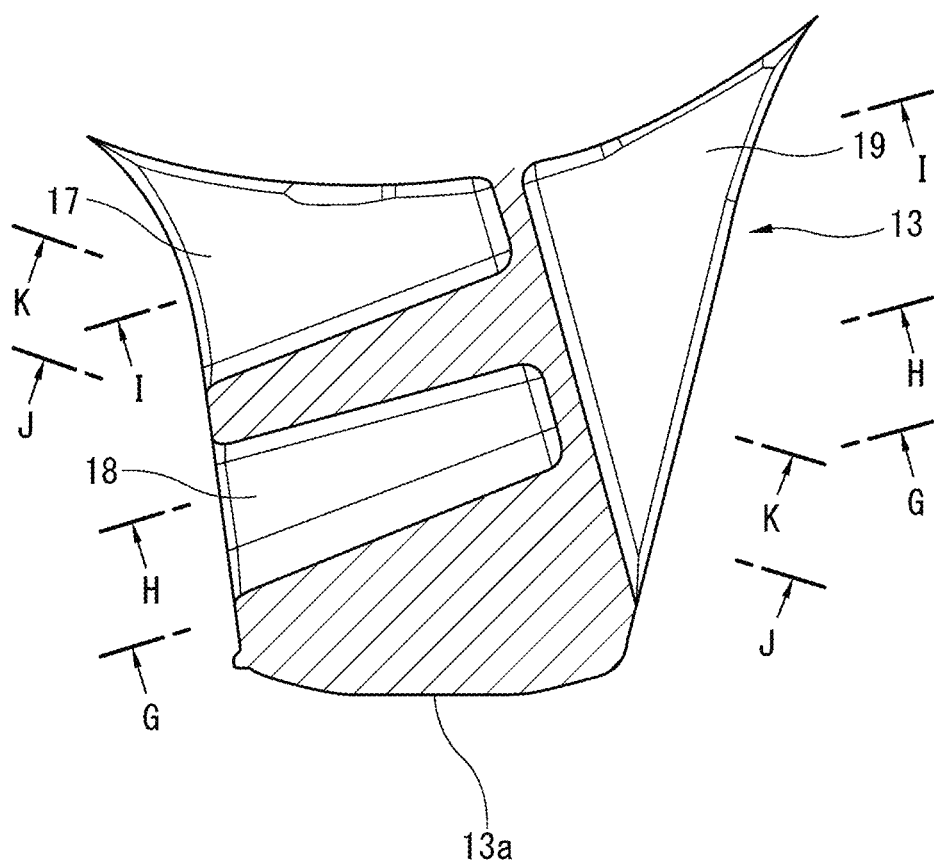
In FIG. 4, (a) is a sectional view along a line P-P in FIG. 3, (b) is a sectional view along a line G- G in (a), (c) is a sectional view along a line H-H or I-I, (d) is a sectional view along a line J-J, and (e) is a sectional view along a line K-K.
Figure 4:
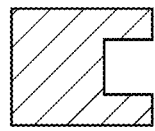
Figure 4:
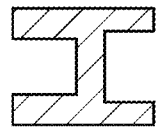
Figure 4:
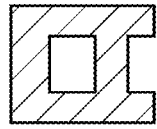
Figure 4:
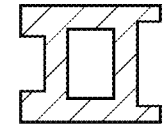

As shown in FIGS. 3 and 4, jacking point 13 has a substantially rectangular shape when viewed at a cross section along a line P-P, and includes lightening holes 17 to 19 for weight reduction. Lightening holes 17 to 19 are disposed in both ends of jacking point 13 in the front-and-rear direction of vehicle 10. Furthermore, jacking point 13 includes a pair of side walls 13b and 13c and a bottom 13a formed between the pair of side walls (i.e., a pair of pillars) 13b and 13c. Bottom 13a is structured to receive the jacking device, and is referred to as receiver 13a hereinafter.

<Receiver 13a> The following describes receiver 13a with reference to FIG. 3. Receiver 13a allows jacking-up of vehicle 10 with the jacking device from any position.

Receiver 13a includes an undersurface including at its substantially center a recessed portion having a concave cross section. In detail, the undersurface of receiver 13a includes: a bottom surface 20 of the recessed portion which is a rectangular flat surface; lower inner side surfaces 21a and 21c that are curved surfaces spreading upwardly and continuously with long sides of bottom surface 20; upper inner side surfaces 22a and 22c that are inclined flat surfaces spreading upwardly and continuously with upper edges of lower inner side surfaces 21a and 21c; lower inner side surfaces 21b and 21d that are curved surfaces spreading upwardly and continuously with short sides of bottom surface 20; and upper end surfaces 22b and 22d that are flat surfaces spreading continuously with upper edges of lower inner side surfaces 21b and 21d.

Thus, receiver 13a includes the five flat surfaces and the four curved surfaces. The surfaces 21a, 21c, 22a, and 22c are disposed along a line in the width direction of vehicle 10. The surfaces 21b, 21d, 22b, and 22d are disposed along a line in the front-and-rear direction of vehicle 10. Furthermore, lower inner side surfaces 21a to 21d surround bottom surface 20, while upper inner side surfaces 22a and 22c and upper end surfaces 22b and 22d surround lower inner side surfaces 21a to 21d. Thus, lower inner side surfaces 21a to 21d are disposed between bottom surface 20 and the surfaces 22a to 22d.

Bottom surface 20 is structured as a flat jacking point surface lifted up first upon locating the jacking device, and is greater in area than any one of the surfaces 21a to 21d and 22a to 22d. Hereinafter, bottom surface 20 is referred to as jacking point surface 20.

Each of the surfaces 22a to 22d is a flat surface structured to receive partial contact in case that vehicle 10 is maximally inclined during jacking-up of vehicle 10. Specifically, the jacking-up of vehicle 10 inclines vehicle 10, and causes the jacking device to go out of jacking point surface 20 and come into oblique partial contact with one of the surfaces 22a to 22d. Thus, the surfaces 22a to 22d serve as partial contact surfaces with the jacking device.

Each of lower inner side surfaces 21a to 21d is formed to be as great as possible in curvature radius R and thereby be approximately flat. This configuration of shaping lower inner side surfaces 21a to 21d to be approximately flat serves to distribute load concentrated due to jacking-up and allow stress relaxation. Especially, the configuration of forming lower inner side surfaces 21a to 21d to be the curved surfaces great in curvature radius R facilitates the stress relaxation because such curved surfaces are compressed and deformed to be flat by jacking-up.

In case of forming jacking point 13 to be solid (i.e., not hollow), such configuration serves to ensure rigidity and reduce stress, but would increase electric motor 11 in weight and generate shrinkage cavities inside electric motor 11. In view of this, jacking point 13 in the present embodiment has a thin shape that is ensured in rigidity while being formable with use of a slide mold. Specifically, jacking point 13 is formed integrally with housing 16 by casting. The thin shape of jacking point 13 is determined based on a combination of cross sectional shapes of FIG. 4 (b) to (e) each of which is equal to or greater than a predetermined value in sectional secondary moment. This reduces a possibility of damaging jacking point 13.

<Stress Relaxation, Sound-and-Vibration Suppression> Side walls 13b and 13c of jacking point 13 are likely to undergo excessive stress at their roots upon jacking-up. Accordingly, the roots of side walls 13b and 13c are shaped in view of stress relaxation and sound-and-vibration suppression.

Figure 5:
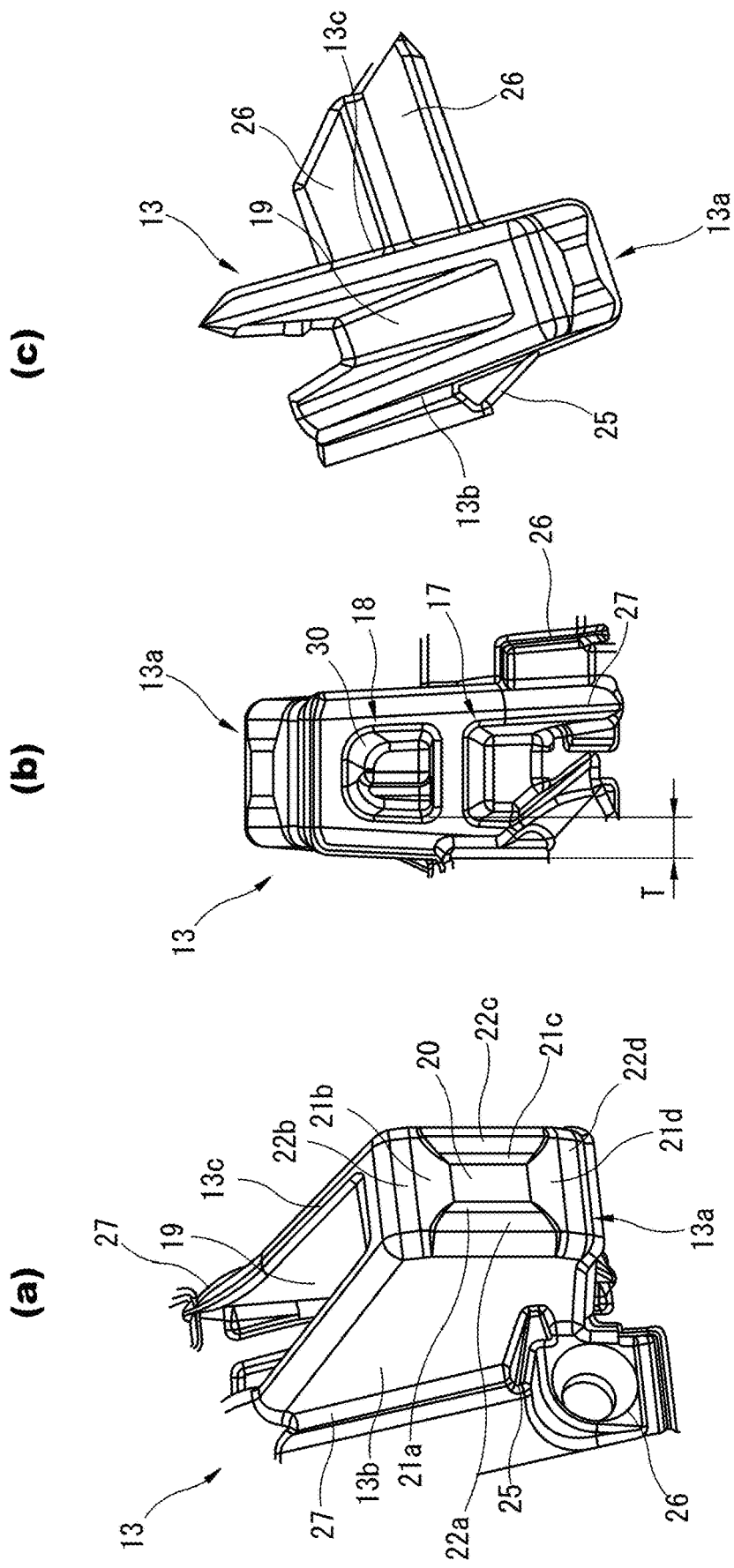
In FIG. 5, (a) is a perspective view of a bottom of the jacking point, and (b) and (c) are respectively a front view and a rear view corresponding to (a).

(1) As shown in FIG. 5 (a) and (b), each of the roots of side walls 13b and 13c of jacking point 13 includes a curved surface 27. Each of the curved surfaces 27 has a shape satisfying a condition of "(curvature radius R)/(thickness T of side wall 13b, 13c)≥5" in order to mitigate stress inside the motor due to shrinkage fitting of the stator and stress at the roots due to jacking-up.

(2) Jacking point 13 includes lightening holes 17 to 19. This weakens jacking point 13 in vertical rigidity, and may cause horizontal rolling of jacking point 13 during traveling of vehicle 10 and thereby disturb the travel. Accordingly, as shown in FIG. 5 (a) and (c), jacking point 13 includes a sound-and-vibration suppression boss 26 adjacently to one of the roots, for reducing a width of the rolling.

The above configuration of sound-and-vibration suppression boss 26 is merely an example of a measure for suppressing sound and vibration, and may be modified to reduce the rolling width of jacking point 13 by forming a vertical rib or a boss configured in another manner. In addition, the one of the roots is further provided with a stress relaxation projection 25 adjacent to sound-and-vibration suppression boss 26. Stress relaxation projection 25 serves to suppress concentration of stress on a parting line of the root upon jacking-up.

(3) Lightening hole 18 of jacking point 13 defines a cylindrical space inside it, and includes an inner peripheral surface formed as a stress relaxation curved surface 30. Stress relaxation curved surface 30 satisfies a condition of "(curvature radius R)/(thickness T)≥0.8" in order to reduce a bending moment upon jacking-up.

<Effects> Jacking point 13 according to the first embodiment described above presents the following effects.

(A) The jacking device is located at jacking point surface 20 upon temporarily lifting up vehicle 10 for tire exchange etc.

The lifting up of vehicle 10 inclines vehicle 10, and causes the jacking device to go out of jacking point surface 20. However, the jacking device comes into oblique partial contact with the partial contact surfaces 22a to 22d around jacking point surface 20, as described above. This prevents the jacking device from going out of receiver 13a, and suppresses the vehicle from being deformed or damaged due to jacking-up.

(B) Jacking point 13 is formed integrally with housing 16 by casting. This eliminates necessity for installing additional part 2 to make jacking point surface 4 project as disclosed in Patent Document 1. This serves to reduce the number of components, improve efficiency of jacking operation, and reduce a cost.

(C) Jacking point 13 is provided with the measures for stress relaxation and sound-and-vibration suppression as described above. This suppresses the stress due to jacking-up and the stress due to shrinkage fitting of the stator from concentrating on the roots, while suppressing the rolling width during vehicle traveling.

(D) Jacking point 13 has the thin shape ensured in strength while including lightening holes 17 to 19, as described above. This serves to reduce a weight of jacking point 13.

Figure 6:
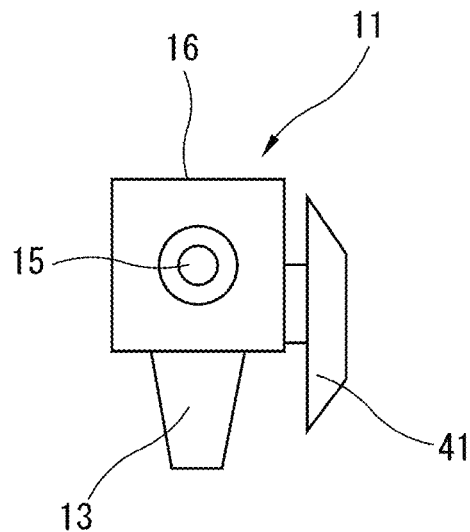
In FIG. 6, (a) and (b) are respectively a side view and a front view of an electric motor including a jacking point according to a second embodiment.
Figure 6:
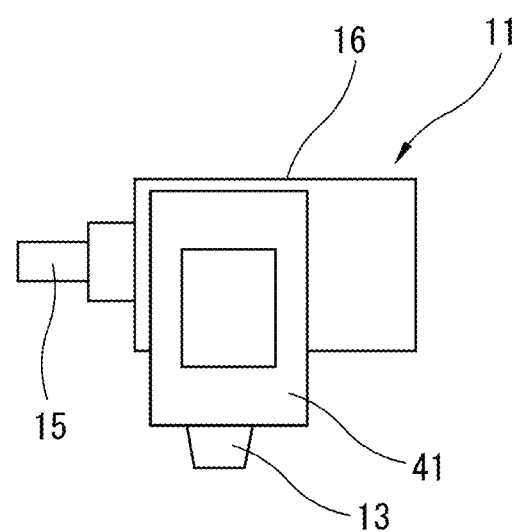

[Second Embodiment] The following describes the second embodiment with reference to FIG. 6.

According to the second embodiment, electric motor 11 mounted in vehicle 10 includes a vehicle protector 41 made of a sheet metal.

Vehicle protector 41 is fixed to housing 16 by screw fastening or welding, and protects jacking point 13 against ground fault and short circuit fault of electric motor 11 due to vehicle collision.

Figure 7:
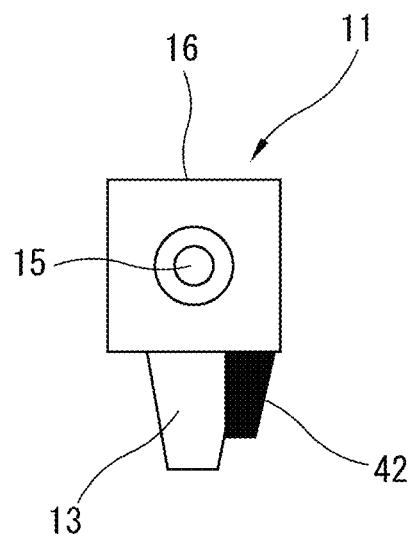
In FIG. 7, (a) and (b) are respectively a side view and a front view of an electric motor including a jacking point according to a third embodiment.
Figure 7:
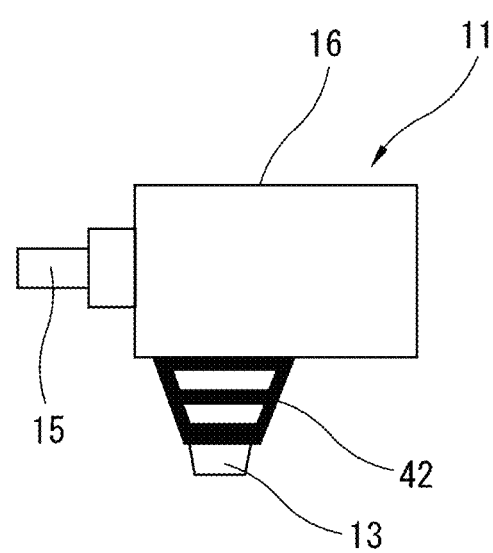

[Third Embodiment] The following describes the third embodiment with reference to FIG. 7. According to the third embodiment, electric motor 11 includes a vehicle protector 42 shaped ribbed and formed integrally with housing 16 by casting. Similarly to vehicle protector 41, vehicle protector 42 protects jacking point 13 against ground fault and short circuit fault of electric motor 11 due to vehicle collision.

Figure 8:
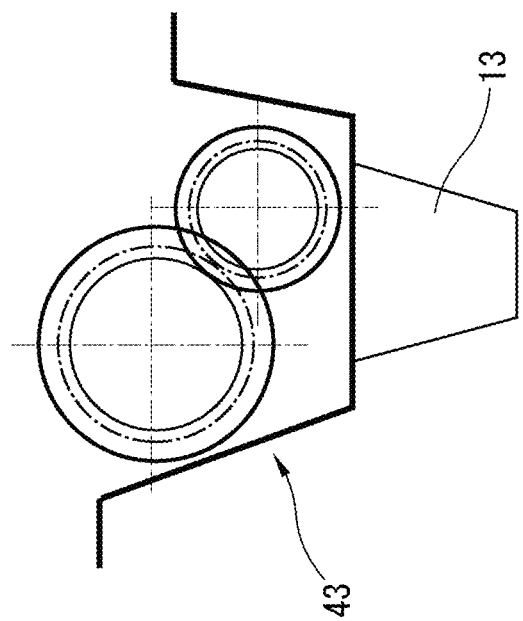
In FIG. 8, (a) and (b) are partial sectional views showing jacking points according to a fourth embodiment.
Figure 8:
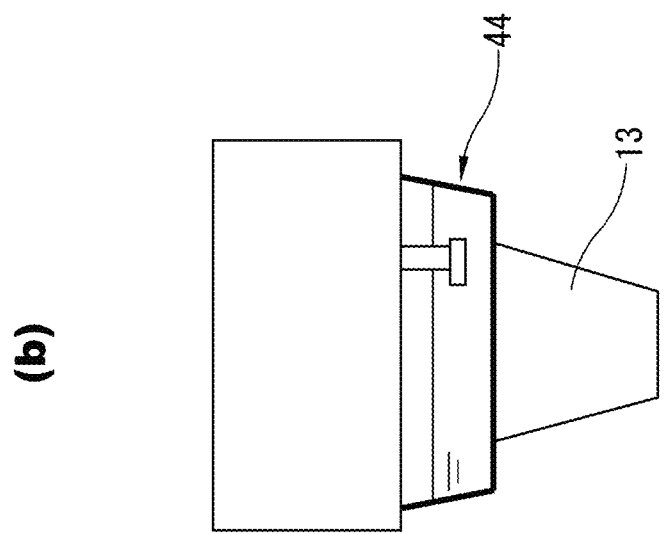
Figure 9:
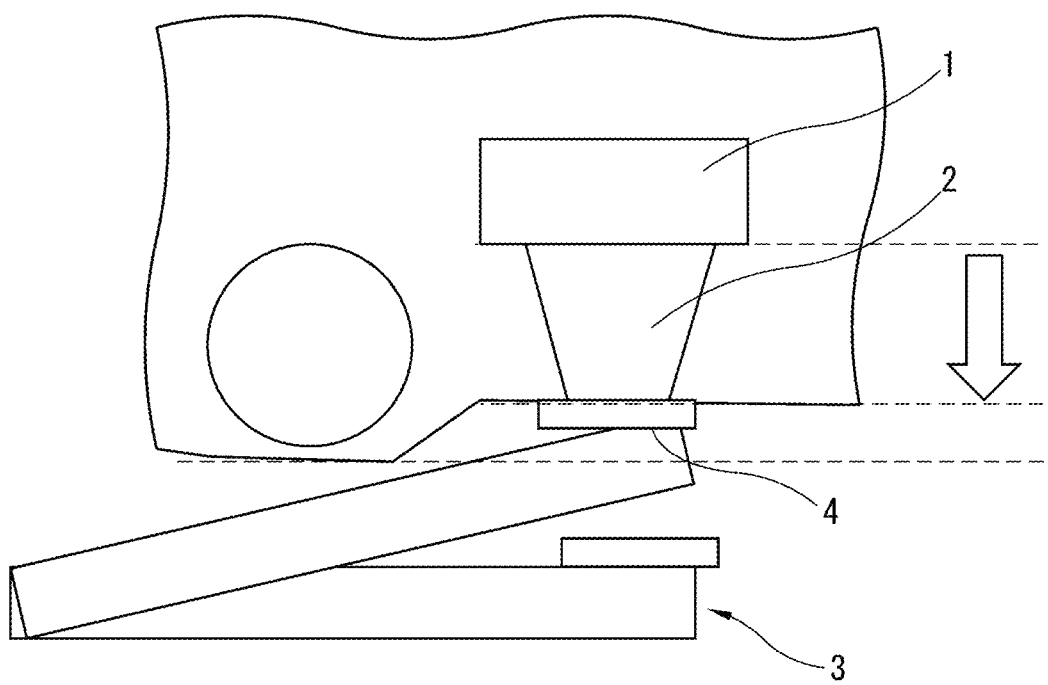
FIG. 9 is a partial sectional view for Patent Document 1.

[Fourth Embodiment] The following describes the fourth embodiment with reference to FIG. 8. In FIG. 8 (a), jacking point 13 is applied to a gear case 43 mounted in the vehicle. In FIG. 8 (b), jacking point 13 is applied to an oil pan 44 mounted in the vehicle.

Thus, jacking point 13 may be added to a vehicle component other than electric motor 11. FIG. 8 (a) and (b) are merely examples, and jacking point 13 may be added to a vehicle component other than ones shown therein.

The present invention is not limited to the above embodiments, but may be modified within scope of the claims. For example, it is unnecessary to form all of lightening holes 17 to 19. The number of the lightening hole(s) may be changed depending on the weight of jacking point 13. It is allowed to omit one of lightening holes 17 and 18 and lightening hole 19, or omit one of lightening hole 17 and lightening hole 18. However, it is favorable to avoid omission of lightening hole 18, because lightening hole 18 includes the stress relaxation curved surface 30.

The invention claimed is:

1. A jacking point structure disposed to project from a bottom surface of a vehicle and structured to be jacked up by a jacking device, the jacking point structure comprising:
a bottom including:
  a jacking point surface structured to be lifted up first by the jacking device; and
  a partial contact surface disposed around the jacking point surface, wherein:
    the bottom of the jacking point structure includes a recessed portion having an inversed U shape when viewed at a cross section;
    the jacking point surface is composed of a bottom surface of the recessed portion;
    the partial contact surface is composed of an inclined inner side surface of the recessed portion;
    each of the jacking point surface and the partial contact surface is flat;
    the bottom of the jacking point structure includes a curved surface between the jacking point surface and the partial contact surface;
    the curved surface has a curvature radius set such that the curved surface is approximately flat; and
    the partial contact surface is structured such that the jacking device comes out of contact with at least a portion of the jacking point surface and comes into oblique partial contact with the partial contact surface when the vehicle is maximally inclined during jacking-up of the vehicle.

2. The jacking point structure as claimed in claim 1, the jacking point structure further comprising:
a sound-and-vibration suppression part disposed in an outer periphery of a root of the jacking point structure and structured to suppress horizontal rolling of the jacking point structure.

3. The jacking point structure as claimed in claim 1, the jacking point structure further comprising:
a lightening hole disposed in one of both ends of the jacking point structure.

4. The jacking point structure as claimed in claim 3, wherein:
the lightening hole includes an inner surface curved to satisfy a condition of
(a curvature radius of the inner surface)/(a thickness from the inner surface to a side surface of the jacking point structure)≥0.8.

5. The jacking point structure as claimed in claim 4, the jacking point structure further comprising:
a curved surface disposed in an outer periphery of a root of the jacking point structure, structured to relax stress due to the jacking-up, and curved to satisfy a condition of
(a curvature radius of the curved surface)/(the thickness)≥5.

6. The jacking point structure as claimed in claim 1, the jacking point structure further comprising:
a protector structured to mitigate shock upon vehicle collision.

7. The jacking point structure as claimed in claim 1, wherein the jacking point structure is formed by casting with use of a slide mold.

8. The jacking point structure as claimed in claim 7, wherein the jacking point structure is formed by casting, integrally with an electric motor or with an electric motor and a power converter.

9. The jacking point structure as claimed in claim 7, wherein the jacking point structure is formed by casting, on a speed reducer, a gear case, or an oil pan.

* * * * *